(12) United States Patent
Son et al.

(10) Patent No.: US 11,977,917 B2
(45) Date of Patent: May 7, 2024

(54) APPARATUS FOR DATA PROCESSING FOR SIMULTANEOUSLY PREFORMING ARTIFICIAL INTELLIGENCE FUNCTION PROCESSING AND DATA COLLECTION AND METHOD THEREFOR

(71) Applicant: Konan Technology Inc., Seoul (KR)

(72) Inventors: Hyungjae Son, Seoul (KR); Hansang Cho, Seoul (KR)

(73) Assignee: Konan Technology Inc., Seoul (KR)

( * ) Notice: Subject to any disclaimer, the term of this patent is extended or adjusted under 35 U.S.C. 154(b) by 84 days.

(21) Appl. No.: 17/730,802

(22) Filed: Apr. 27, 2022

(65) Prior Publication Data

US 2023/0205579 A1 Jun. 29, 2023

(30) Foreign Application Priority Data

Dec. 24, 2021 (KR) .......................... 10-2021-0186886

(51) Int. Cl.
*G06F 9/48* (2006.01)
*G06F 9/54* (2006.01)

(52) U.S. Cl.
CPC ............ *G06F 9/4881* (2013.01); *G06F 9/485* (2013.01); *G06F 9/542* (2013.01)

(58) Field of Classification Search
CPC ........ G06F 9/4881; G06F 9/485; G06F 9/542; G06F 9/5066; G06F 9/5077; G06F 12/0866; G06F 3/061; G06F 3/0653; G06F 3/0659; G06F 3/0689
See application file for complete search history.

(56) References Cited

U.S. PATENT DOCUMENTS

2021/0373944 A1 12/2021 Lee et al.
2022/0164707 A1* 5/2022 Park ...................... G06N 20/00

FOREIGN PATENT DOCUMENTS

| KR | 10-2010-0131783 A | 12/2010 |
| KR | 10-2019-0082645 A | 7/2019 |
| KR | 10-2020-0057903 A | 5/2020 |
| KR | 10-2257028 B1 | 5/2021 |
| KR | 10-2021-0148586 A | 12/2021 |

OTHER PUBLICATIONS

Korean Office Action issued on Mar. 17, 2022 in counterpart Korean Patent Application No. 10-2021-0186886 (4 pages in Korean).

* cited by examiner

*Primary Examiner* — Hiep T Nguyen
(74) *Attorney, Agent, or Firm* — NSIP Law

(57) ABSTRACT

An apparatus for data processing for simultaneously performing artificial intelligence (AI) function processing and data collection and a method thereof are provided. The method of simultaneously performing AI function processing and data collection includes: receiving, by a data receiver, data; transferring, by the data receiver, the received data to a disk handler; accessing, by the disk handler, a disk in an idle state among a plurality of disks and performing writing of a file; after the writing of the file is completed, notifying, by the disk handler, a scheduler that the writing of the file is completed; transmitting, by the scheduler, job information about a job, for which the file writing is completed together with a job execution command to an AI module handler; and accessing, by the AI module handler, an AI module in an idle state among a plurality of AI modules and executing an AI function.

9 Claims, 5 Drawing Sheets

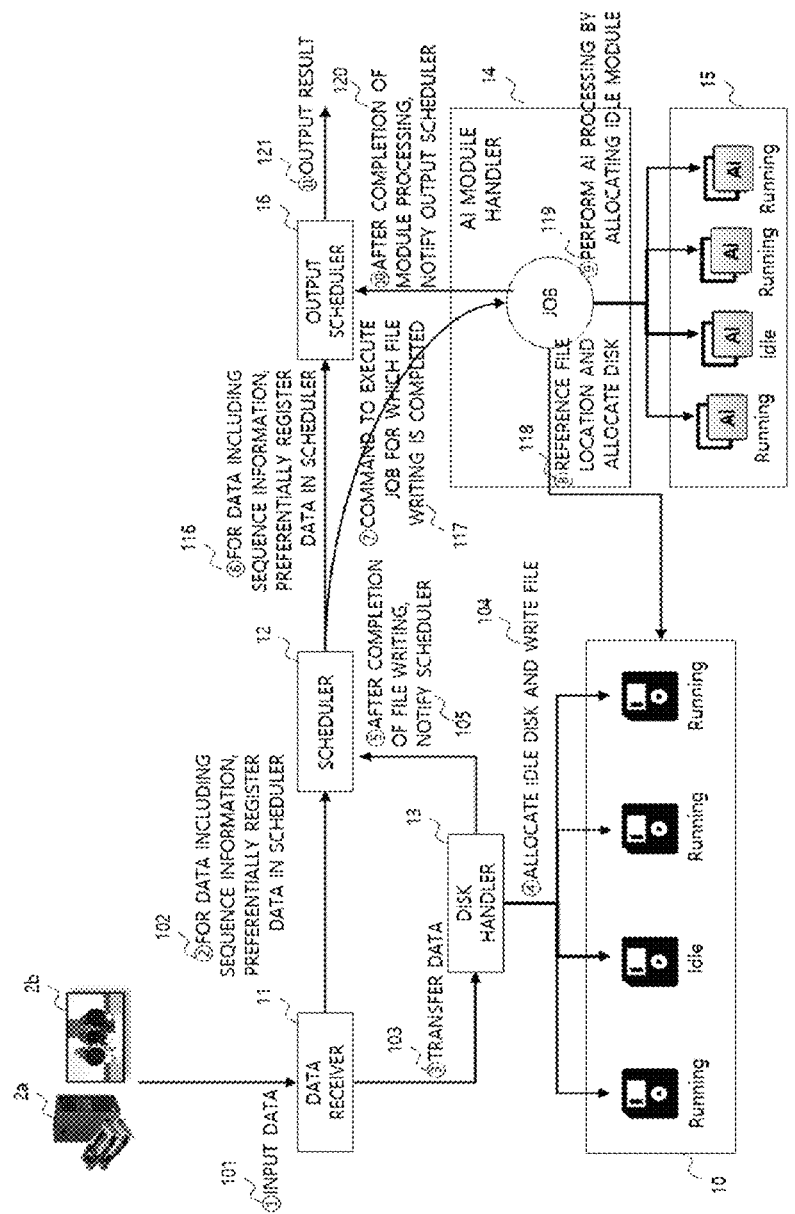

APPARATUS FOR DATA PROCESSING FOR SIMULTANEOUSLY PREFORMING ARTIFICIAL INTELLIGENCE FUNCTION PROCESSING AND DATA COLLECTION AND METHOD THEREFOR

CROSS-REFERENCE TO RELATED APPLICATION(S)

This application claims priority from Korean Patent Application No. 10-2021-0186886, filed on Dec. 24, 2021, in the Korean Intellectual Property Office, the disclosure of which is incorporated herein by reference in its entirety.

BACKGROUND

1. Field

The following description relates to a technology of processing data. The present invention is derived from research conducted as part of the development of next-generation artificial intelligence core technology of the Ministry of Science and Information and Communications Technology [Project No.: 2021-0-00451-001, unique project No.: 1711134507, research project name: Flexible Deep Learning Framework Technology Development that Can Be Used for Next-Generation AI Research Development, research period: 2021.04.01 to 2022.12.31].

2. Description of Related Art

Artificial intelligence (hereinafter referred to as "AI"), particularly, deep learning, is a technology that uses a model trained through a large amount of data to solve various problems for which it is difficult to provide an approach with the existing classic algorithms, in which the quantity and quality of data have a great influence on the technical accuracy. In addition, unlike AI of the past that merely handled problems of simple domains, such as board games, AI of today is solving high-order and diverse problems, such as natural language processing, evaluation and reasoning, situational awareness, image/speech analysis, and the like.

Since the AI functions are highly dependent on data, continuous collection and update of data are required not only in developing the initial model, but also in optimizing and maintaining the performance according to the target of problem solving or each field environment. Therefore, in order to construct a stable AI device, data collection and AI function processing need to be performed simultaneously.

For example, user-customized product recommendation functions used in most online shopping malls operate to, at the same time as a recommendation algorithm is performed, continuously collect web usage records of a user, provide recommendation results to other users having similar tastes, and also allow the users to report whether the recommendation results are correct and reflect the reports in the improvement of algorithms.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an apparatus for processing data and a method thereof that are capable of improving the processing performance and stability of a real-time AI device and enabling simultaneous data collection, which is an essential element for an AI function.

In one general aspect, there is provided a method of simultaneously performing artificial intelligence (AI) function processing and data collection, which is a method of simultaneously performing AI function processing and data collection using an apparatus for data processing, the method including: receiving, by a data receiver, data; transferring, by the data receiver, the received data to a disk handler; accessing, by the disk handler, a disk in an idle state among a plurality of disks and performing writing of a file; after the writing of the file is completed, notifying, by the disk handler, a scheduler that the writing of the file is completed; transmitting, by the scheduler, job information about a job, for which the file writing is completed, together with a job execution command to an AI module handler; and accessing, by the AI module handler, an AI module in an idle state among a plurality of AI modules and executing an AI function.

The executing of the AI function may include: retrieving, by the AI module handler, a disk and a storage path in which the file is stored using the job information received from the scheduler; waiting, by the AI module handler, when the retrieved disk is in a running state, and starting reading of the file when the retrieved disk is switched to an idle state; and executing, by the AI module handler, the AI function using the AI module in the idle state with data that is loaded from the disk to a memory through the reading of the file.

The method may further include, before the transferring, by the data receiver, of the received data to the disk handler, in a case in which the received data is data including sequence information, preferentially inputting, by the data receiver, current data information to the scheduler in order.

The method may further include, checking, by the scheduler, a current state of a buffer in response to receiving transferred data, and upon checking that the buffer is full, managing the buffer to delete first input data among data in a standby state and receive new data.

The managing of the buffer may include, selecting, by the scheduler, a buffer management routine according to a type of the apparatus for data processing.

The method may further include, waiting in an idle state, by a predetermined disk in a storage, while not in use, and when accessed by the disk handler for the writing of file, switching to a running state, and in response to the writing of the file ending, returning to an idle state and waiting; and waiting in an idle state, by a predetermined disk in the storage, while not in use, and when accessed by the AI module handler for file reading, switching to a running state, and in response to the file reading ending, returning to an idle state and waiting.

The method may further include, waiting in an idle state, by a predetermined AI module among the plurality of AI modules, while not in use, and when accessed by the AI module handler for AI module execution, switching to a running state, and in response to the AI module execution ending, returning to an idle state and waiting.

The method may further include, after AI module function processing is completed, notifying, by the AI module handler, an output scheduler that AI module function processing is completed; and outputting, by the output scheduler, a result.

In another general aspect, there is provided an apparatus for data processing, the apparatus including: a data receiver configured to receive data; a disk handler configured to receive the data transferred from the data receiver, access a disk in an idle state among a plurality of disks, and perform writing of a file; a scheduler configured to, when the writing of the file is completed, receive a notification that the writing of the file is completed from the disk handler, and transfer job information about a job, for which the writing of the file is completed, together with a job execution command to an artificial intelligence (AI) module handler; and the AI module handler configured to access an AI module in an idle state among a plurality of AI modules, and execute an AI function according to the job execution command of the scheduler.

Other features and aspects will be apparent from the following detailed description, the drawings, and the claims.

BRIEF DESCRIPTION OF THE DRAWINGS

FIG. 5 is a diagram illustrating the configuration of an extended apparatus according to addition of an output management scheduler according to an embodiment of the present invention.

Figure 1:
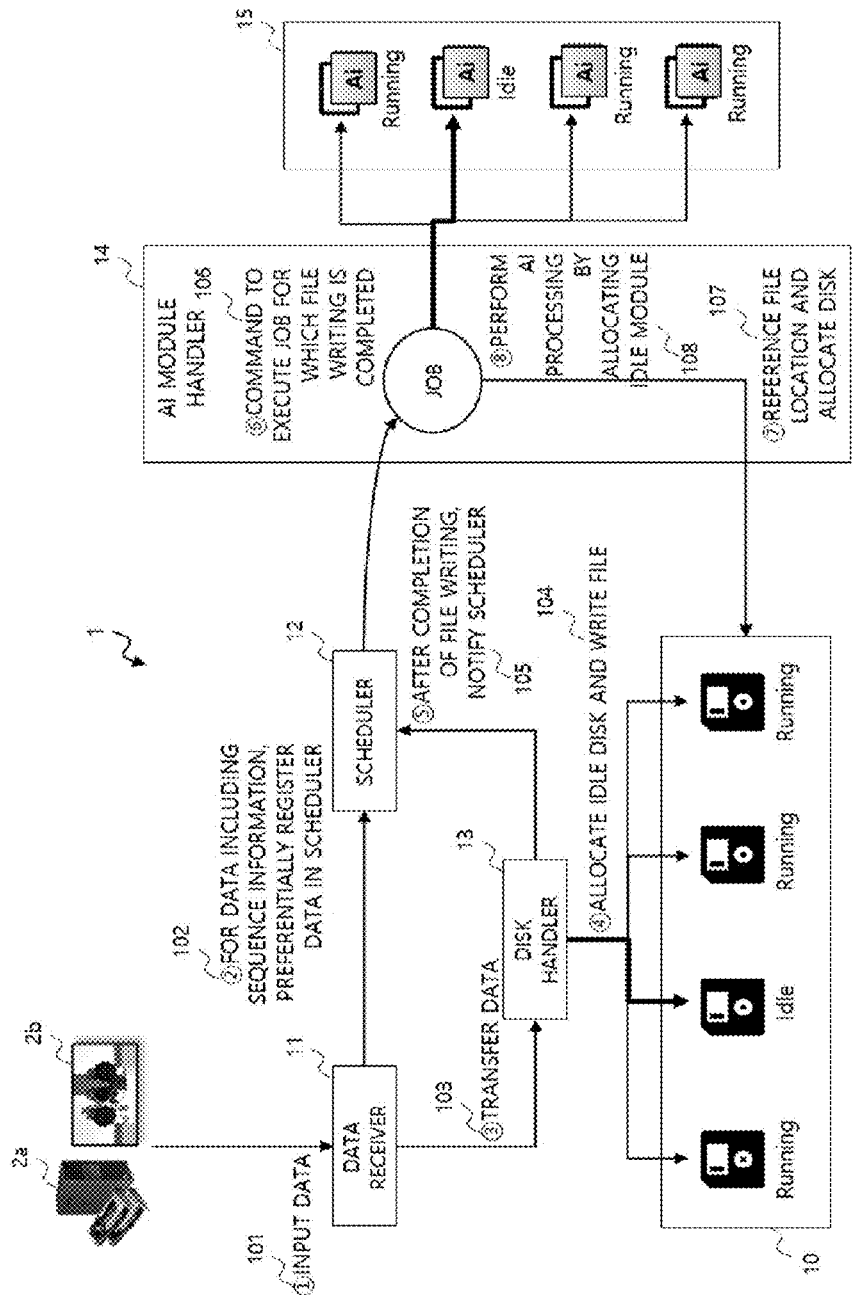
FIG. 1 is a diagram illustrating the configuration of an apparatus for data processing according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be clear to those of ordinary skill in the art. Also, descriptions of well-known functions and constructions may be omitted for increased clarity and conciseness.

Advantages and features of the present disclosure and methods of achieving them will be apparent from embodiments described below in detail in conjunction with the accompanying drawings. However, the present disclosure is not limited to the embodiments below and may be embodied in many different forms. Rather, these embodiments are provided so that this disclosure will be thorough and complete and will fully convey the concept of the invention to those of ordinary skill in the art. The present disclosure should be defined by the scope of the claims. The same reference numerals refer to the same components throughout the specification.

In describing embodiments of the present disclosure, well-known functions or constructions are not described in detail when it is determined that they would obscure the invention due to unnecessary detail. The terms described below are defined in consideration of functions of the embodiments of the present disclosure and may vary according to the intention of a user or operator, precedent, or the like. Therefore, the terms should be defined based on the whole context of the present disclosure.

Combinations of operations of blocks of each block diagram attached hereto and operations of each flowchart attached hereto may be performed by computer program instructions (execution engines). The computer program instructions may be stored in a processor of a general purpose computer, a special purpose computer, or other programmable data processing devices. Thus, a means to perform a function of each block of each block diagram or an operation of each flowchart is produced by the instructions executed by a processor of a computer or other programmable data processing devices.

The computer program instructions may be stored in a computer usable or readable memory oriented to a computer or other programmable data processing devices to implement functions in a particular way. Thus, an article of manufacture, including an instruction means for performing the function of each block of each block diagram or each operation in each flowchart, may be produced by the instructions stored in the computer usable or readable memory.

Because the computer program instructions may be stored in a computer or other programmable data processing devices, the functions of the blocks of each block diagram and the operations of each flowchart may be provided by these instructions performing a series of operations in the computer or the other programmable data processing devices to produce a process executable by a computer to operate the computer or the data processing device.

In addition, each block or each operation may represent a module, a segment, or part of code that includes one or more executable instructions for executing specified logical functions. In some alternative embodiments, functions referred to with respect to blocks or operations may be performed in an order different from that described herein. For example, two blocks or operations illustrated consecutively may be performed substantially simultaneously or in a reverse order of functions corresponding thereto when necessary.

Hereinafter, embodiments of the present disclosure will be described in detail with reference to the accompanying drawings. However, the embodiments of the present disclosure described below may be modified in various other forms and the scope of the present disclosure is not limited thereto. Embodiments of the present disclosure are provided to more fully describe the present disclosure to those of ordinary skill in the art.

Hereinafter, embodiments of the present invention will be described in detail with reference to the accompanying drawings.

FIG. 1 is a diagram illustrating the configuration of an apparatus for data processing according to an embodiment of the present invention;

Referring to FIG. 1, an apparatus 1 for data processing (hereinafter referred to as an "apparatus") may simultaneously perform artificial intelligence (hereinafter referred to as "AI") function processing and data collection. The apparatus 1, when simultaneously performing AI function processing and data collection, is provided to minimize input/output (I/O) performance degradation, which causes a bottleneck, due to the characteristics of hard disks, thereby realizing the original performance of the AI functions. As an additional effect, the apparatus 1 is provided to alleviate the load of a hard disk to reduce the probability of data corruption, such as bad sectors.

The apparatus 1 is a single real-time apparatus that receives data from an external device and processes the data in real time. A non-real-time apparatus that does not need to simultaneously process data reading and data writing, or an apparatus divided into two or more apparatuses to collect data in a separate apparatus is not assumed for the present invention.

Construction of the apparatus 1 that simultaneously performs AI function processing and data collection is performed, in the case of processing a plurality of algorithms with different input types or processing an algorithm with a different input data length in each situation, by storing the data input to the apparatus 1 first as a file, and then reading the data by each AI module to process the algorithm.

In this case, since the latest AI functions, such as deep learning, require a large amount of data due to the characteristics thereof, a hard disk (HDD) type storage is used. However, due to the characteristics of the HDD which accesses data with a thin needle-like head moving on a circular plate referred to as a "platter," small-sized data may be processed at a very slow speed, and such data access by a physical device may significantly reduce the performance when data reading and writing are simultaneously performed.

When large data is continuously written, the storage exhibits the maximum performance, but when small data is repeatedly written, the performance may be significantly degraded. When reading and writing are simultaneously performed, the processing performance may drop by half.

In order to solve the above limitations, the apparatus 1 includes a storage 10, a data receiver 11, a scheduler 12, a disk handler 13, an AI module handler 14, and a plurality of AI modules 15.

The storage 10 includes a plurality of disks. The apparatus 1 receives data from an external device 2 through the data receiver 11, and transfers the received data to the disk handler 13. The disk handler 13 writes the received data to a disk currently in an idle state among the plurality of disks. At the same as the writing of the data, the data receiver 11 transfers occurrence of a data input event and information about an allocated disk to the scheduler 12, and the scheduler 12 performs scheduling such that the data is processed by an AI module in an idle state among the plurality of AI modules driven in one or more threads or processes.

Hereinafter, a method of processing data for simultaneously performing AI function processing and data collection by the apparatus 1 will be described below.

The first operation: data input (101)

The data receiver 11 receives original data to be collected and processed. The data receiver 11 may receive the data input from a network server 2a, such as a video streaming device, or an external device 2b, such as a web camera, or may receive the data input in the form of a web page collected by a web crawler. Methods of receiving data may include all types of methods currently used.

The second operation: in case of data including sequence information, preferential registration of the data in the scheduler (102)

In the case of video analysis, continuous frame information linked back and forth may be required. In the case of natural language processing, a sequence relationship may be required to identify the context before and after each sentence. To this end, before transferring data to the disk handler 13, the data receiver 11 preferentially inputs current data information to the scheduler 12 in order, for the data to be left in a standby state. In this case, the scheduler 12 needs to be designed in a first-in, first-out (FIFO) data structure, such as a queue. When the sequence relationship is not required, the second operation 102 may be omitted.

The third operation: data transfer (103)

The data receiver 11 transfers the received data to the disk handler 13 for the received data to be collected and preserved. In this case, the transfer of the data may be implemented in various methods, such as using a queue, copying a buffer, or transferring a pointer address. Similar to the first operation 101, the method of transferring data may include all types of methods used in general devices.

The fourth operation: file writing by allocating an idle disk (104)

The disk handler 13 having received the data transferred from the data receiver 11 through the preceding third operation 103 accesses a disk using a pooling method. Here, a disk may be in one of an idle state and a running state. When a disk is not in use, the disk waits in an idle state, and when accessed by the disk handler 13 for file writing, or when accessed by the AI module handler 14 for file reading as in the seventh operation 107 and the eighth operation 108 to be described below, switches to a running state.

Since the disk handler 13 selects a disk in an idle state and performs file writing, even when earlier data input is still being processed, the disk handler 13 may access a different disk and perform file writing without a need to wait, thereby reducing the waiting time. In addition, file writing by the disk handler 13 and file reading by the AI module handler 14 are performed through different disks by the scheduler 12 as will be described below, thereby preventing performance from being degraded due to simultaneous input/output (I/O) occurring on a single disk. In this case, the life cycle of the apparatus for each disk state will be described below with reference to FIG. 2.

The fifth operation: notification to scheduler after completion of file writing (105)

The sixth operation: command to execute a job for which file writing is completed (106)

Since the data for which file writing is completed by the disk handler 13 through the preceding fourth operation 104 needs to be processed by the AI module handler 14 at a later time, the disk handler 13 notifies the scheduler 12 that file writing is completed.

The scheduler 12 transfers job information about a job, for which the file writing is completed, together with a job execution command to the AI module handler 14 such that the AI module handler 14 uses an AI module that suits the purpose of the job according to the job information included in the job execution command. In this case, the criterion for the scheduler 12 to transfer the job information to the AI module handler 14 is that first input data among data remaining in the scheduler 12 is given first priority and the transfer time is when file writing of the corresponding data is completed.

The seventh operation: file location reference and disk allocation (107)

The eighth operation: allocation of an idle module to perform AI processing (108).

The AI module handler 14 bundles the seventh operation 107 and the eighth operation 108 and processes the operations sequentially. For example, the AI module handler 14 uses the job information received from the scheduler 12 through the sixth operation 106 to retrieve a disk and a storage path in which the file is stored, and when the disk is in a running state, waits, and when the disk is switched to an idle state, starts reading the file. In this case, the disk returns to a running state. Data loaded from the disk into a memory through the file reading is processed using an AI module in an idle state. Similar to the life cycle of the disk, during processing of an AI algorithm through an AI module, the AI module switches to running, and does not allow access by other jobs until the processing is completed and the AI module returns to an idle state.

Figure 2:
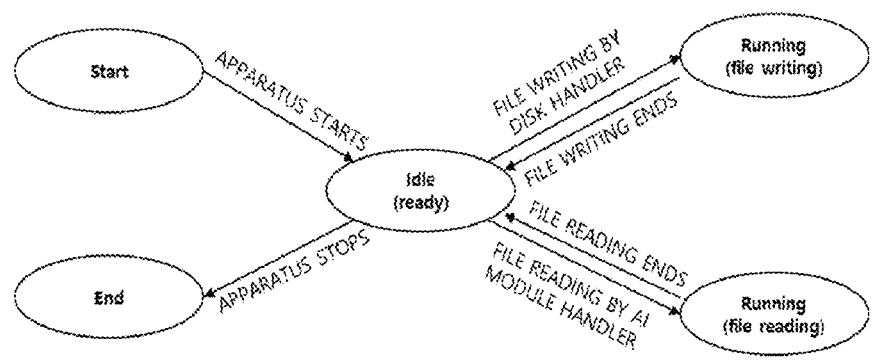
FIG. 2 is a diagram illustrating a life cycle of a disk of the apparatus according to the embodiment of the present invention.

FIG. 2 is a diagram illustrating a life cycle of a disk of the apparatus according to the embodiment of the present invention.

Referring to FIGS. 1 and 2, the disk may enter one of the two states, that is, an idle state and a running state. The disk, while not in use, waits in an idle state, and when accessed by the disk handler 13 for file writing, switches to a running state. When the file writing ends, the disk returns to an idle state and waits.

Similarly, the disk, while not in use, waits in an idle state, and when accessed by the AI module handler 14 for file reading, switches to a running state. When the file reading ends, the disk returns to an idle state and waits.

Figure 3:
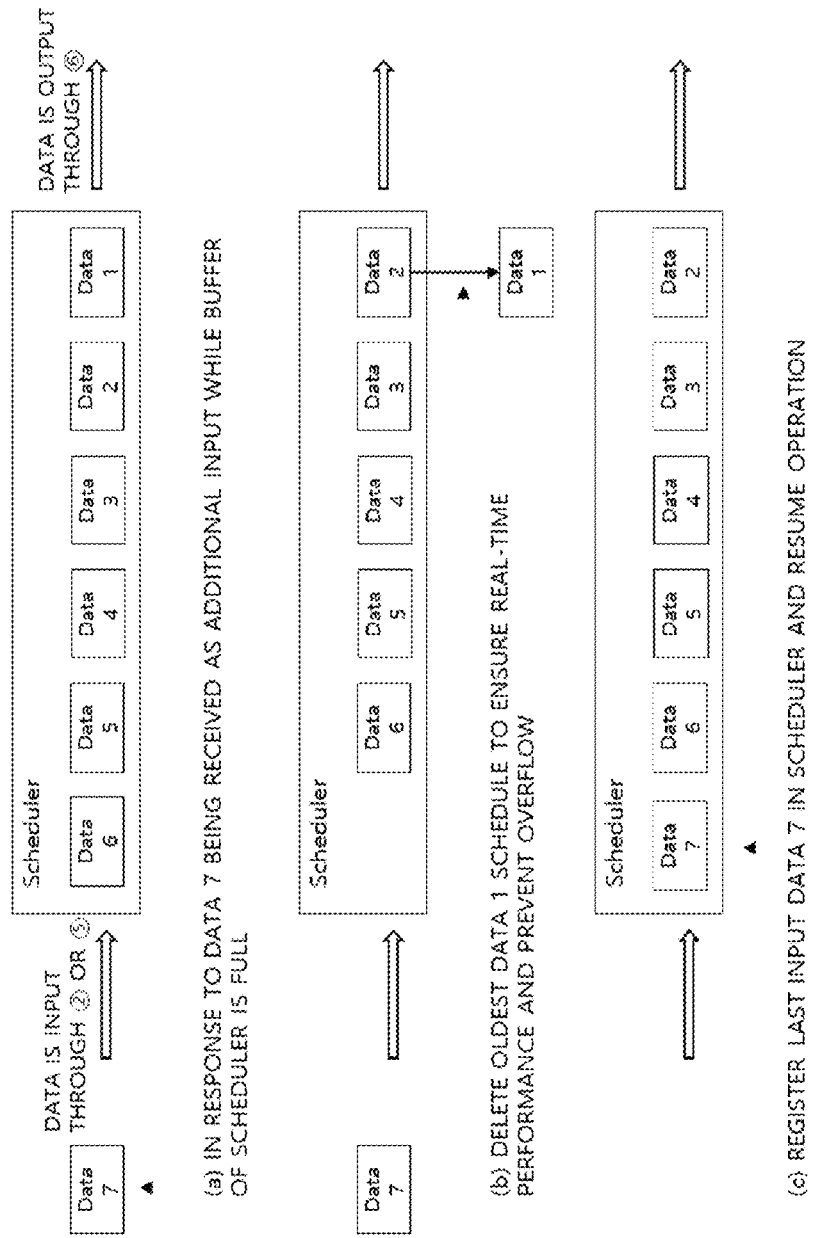
FIG. 3 is a diagram illustrating a scheduler buffer management process for ensuring an input order and real-time performance according to the embodiment of the present invention.

FIG. 3 is a diagram illustrating a scheduler buffer management process for ensuring an input order and real-time operation according to the embodiment of the present invention.

Referring to FIGS. 1 and 3, the scheduler 12 manages a buffer in consideration of the input order.

Here, another important factor is real-time performance. Even when a file write routine or AI function processing is implemented at a speed faster than or equal to the speed at which data is input to the apparatus 1, simultaneous execution of a large number of jobs, such as data reception, file reading/writing, and AI function processing, in one apparatus 1, may lead to performance degradation of the apparatus 1. In this case, the processing speed may become slower than the data input speed. Since the operation target is not software but the apparatus 1, there is a need to prepare for temporary performance degradation unexpectedly caused by H/W interrupt, operating system (OS) context switching, and other bottlenecks.

Therefore, in the design and implementation of the scheduler 12, the scheduler 12 is designed to, upon receiving data through the second operation 102 and the fifth operation 105, check the current state of the buffer of the scheduler 12, and in response to the buffer being full, delete first input data among data that is in a standby state and then input new data.

Accordingly, the speed difference between the data input in the first operation 101 and the AI function processing (output) in the eighth operation 108, or the delay time between input and output caused by the performance degradation described above is alleviated so that real-time performance may be ensured and buffer overflow may be prevented. In addition, there is no influence on data collection.

For example, as shown in FIG. 3, (a) in response to Data 7 being received as an additional input while the buffer of the scheduler 12 is full, (b) Data 1 input on the earliest order is deleted from the buffer to ensure real-time performance and prevent overflow, and (c) Data 7 input on the last order is registered in the buffer and operation resumes.

The scheduler 12 may select a buffer management routine according to the type of the apparatus 1 and operate. The buffer management routine of the scheduler 12 may be selectively set to be operable only when there is no need to output some of the data.

For example, when the apparatus 1 is an apparatus for detecting and tracking an object based on a video (which is an apparatus for tracking a movement of an object, such as a specific object or person, while displaying the result on an image in the form of a box), destroying some pieces of image data in the scheduler 12 does not exert an influence on the final result. In the object detection and tracking, the key result is a timeline from the beginning to the end of an event and coordinate information of a box indicating the location and size of the object at the time, and in a real time video played at a frame rate greater than or equal to 30 fps, omission of some frames neither affects the result evaluation nor causes the user who watches the video to feel any significant difference.

On the other hand, when the apparatus 1 is a log analysis apparatus, omission of only one log may lead to an important event being missed or a failure to accurately track a process in which a problem occurs. Accordingly, the apparatus 1 needs to prevent the buffer management routine of the scheduler 12 from operating and instead further increase the size of the buffer such that a buffer overflow does not occur when temporary performance degradation occurs.

Figure 4:
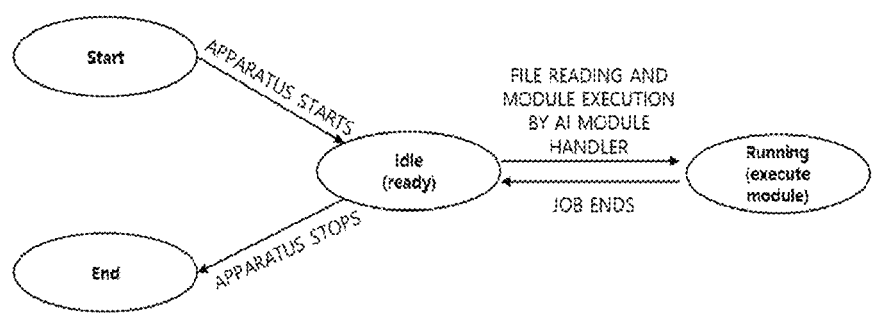
FIG. 4 is a diagram illustrating a life cycle of an AI module of the apparatus according to the embodiment of the present invention.

FIG. 4 is a diagram illustrating a life cycle of an AI module of the apparatus according to the embodiment of the present invention.

Referring to FIGS. 1 and 4, unlike uses of the running state of a disk that are divided into file reading and file writing, the running state of an AI module is provided only for one use, that is, AI module execution. For example, when a predetermined AI module among a plurality of AI modules is not in use, the predetermined AI module waits in an idle state, and when accessed by the AI module handler 14 for AI module execution, switches to a running state, and when the AI module execution ends, returns to an idle state and waits.

In this case, each AI module is regarded as having the same processing performance, and since the input sequence is ensured by the scheduler 12, the processing results of the AI modules are also output in order.

FIG. 5 is a diagram illustrating the configuration of an extended apparatus according to addition of an output management scheduler according to an embodiment of the present invention.

Referring to FIGS. 1 and 5, when AI modules having different processing performance are used, or when an algorithm in which input data is variable and the processing time of the AI module is different according to the size of the input data is used, the scheduling job according to the second operation 102, the fifth operation 105, and the sixth operation 106 needs to be further implemented as a subsequent process by the AI module handler 14. However, details of a method of designing and implementing the scheduling job are the same as the second operation 102, the fifth operation 105, and the sixth operation 106 of FIG. 1, and the same descriptions will be omitted, but it should be noted that the extended apparatus 1 performs different operations subsequent to the fifth operation 105.

For example, the apparatus 1, in response to receiving data through the data receiver 11 (101), transfers the data to the disk handler 13 (103). When the data includes sequence information, the data receiver 102 may notify the scheduler 12 that the data includes sequence information (102). The disk handler 13 allocates an idle disk among a plurality of disks and performs file writing (104).

When the file writing is completed, the disk handler 13 notifies the scheduler 12 that the file writing is completed (105). When the data includes sequence information, the scheduler 12 may notify an output scheduler 16 that the data includes sequence information (116).

The scheduler 12 transfers job information about a job, for which the file writing is completed, together with a job execution command to the AI module handler 14 (117). Then, the AI module handler 14 uses the job information received from the scheduler 12 to retrieve a disk and a storage path in which the file is stored (118), and allocates an idle AI module and performs an AI function (119). Then, the AI module handler 14, after the AI module function processing is completed, notifies the output scheduler 16 that the AI module function process is completed (120), and the output scheduler 16 outputs the result (121).

The present disclosure has been described above with respect to embodiments. It will be apparent to those of ordinary skill in the technical field to which the present disclosure pertains that the present disclosure may be implemented in a modified form without departing from the essential characteristics of the present disclosure. Therefore, the embodiments set forth herein should be considered in a descriptive sense only and not for purposes of limitation. The scope of the present disclosure is defined in the claims rather than the foregoing description, and all differences equivalent thereto should be interpreted as being included in the present disclosure.

What is claimed is:

1. A method of simultaneously performing artificial intelligence (AI) function processing and data collection, which is a method of simultaneously performing AI function processing and data collection using an apparatus for data processing, the method comprising:
   receiving, by a data receiver, data;
   transferring, by the data receiver, the received data to a disk handler;
   accessing, by the disk handler, a disk in an idle state among a plurality of disks and performing writing of the received data to a file;
   after the writing of the file is completed, notifying, by the disk handler, a scheduler that the writing of the file is completed;
   transmitting, by the scheduler, job information about the received data, for which the writing of the file is completed together with a job execution command related to the job to an AI module handler; and
   accessing, by the AI module handler, an AI module in an idle state among a plurality of AI modules and executing an AI function according to the job execution command of the scheduler.

2. The method of claim 1, wherein the executing of the AI function includes:
   retrieving, by the AI module handler, a disk and a storage path in which the file is stored using the job information received from the scheduler;
   waiting, by the AI module handler, when the retrieved disk is in a running state, and starting
   reading of the file when the retrieved disk is switched to an idle state; and
   executing, by the AI module handler, the AI function using the AI module in the idle state with data that is loaded from the disk to a memory through the reading of the file.

3. The method of claim 1, further comprising, before the transferring, by the data receiver, of the received data to the disk handler,
   in a case in which the received data is data including sequence information, preferentially inputting, by the data receiver, current data information to the scheduler in order.

4. The method of claim 1, further comprising checking, by the scheduler, a current state of a buffer in response to receiving transferred data, and upon checking that the buffer is full, managing the buffer to delete first input data among data in a standby state and receive new data.

5. The method of claim 4, wherein the managing of the buffer includes selecting, by the scheduler, a buffer management routine according to a type of the apparatus for data processing.

6. The method of claim 1, further comprising:
   waiting in an idle state, by a predetermined disk in a storage, while not in use, and when accessed by the disk handler for the writing of file, switching to a running state, and in response to the writing of the file ending, returning to an idle state and waiting; and
   waiting in an idle state, by a predetermined disk in the storage, while not in use, and when accessed by the AI module handler for file reading, switching to a running state, and in response to the file reading ending, returning to an idle state and waiting.

7. The method of claim 1, further comprising waiting in an idle state, by a predetermined AI module among the plurality of AI modules, while not in use, and when accessed by the AI module handler for AI module execution, switching to a running state, and in response to the AI module execution ending, returning to an idle state and waiting.

8. The method of claim 1, further comprising:
   after AI module function processing is completed, notifying, by the AI module handler, an output scheduler that AI module function processing is completed; and
   outputting, by the output scheduler, a result.

9. An apparatus for data processing, the apparatus comprising:
   a data receiver configured to receive data;
   a disk handler configured to receive the data transferred from the data receiver, access a disk in an idle state among a plurality of disks, and perform writing of the received data to a file; and
   a scheduler configured to, when the writing of the file is completed, receive a notification that the writing of the file is completed from the disk handler, and transfer job information about the received data, for which the writing of the file is completed, together with a job execution command related to the job to an artificial intelligence (AI) module handler;
   wherein the AI module handler is configured to access an AI module in an idle state among a plurality of AI modules, and execute an AI function according to the job execution command of the scheduler.

\* \* \* \* \*